Patented Feb. 16, 1954

2,669,578

UNITED STATES PATENT OFFICE 2,669,578

TRIACETOXY TOLUENE

William S. Knowles, Kirkwood, Mo., assignor to Monsanto Chemical Company, St. Louis, Mo., a corporation of Delaware No Drawing. Application April 20, 1951, Serial No. 222,147

4 Claims. (Cl. 260—479)

This invention relates to triacetoxy toluene; more specifically, this invention relates to an improvement in the process for the preparation of triacetoxy toluene.

Triacetoxy toluene is a valuable intermediate commonly employed for the introduction of "angular" methyl groups into organic compounds. Heretofore triacetoxy toluene has been prepared by the reaction of p-toluquinone with acetic anhydride in the presence of concentrated sulfuric acid at a temperature of 45–50° C. as illustrated by the following equation:

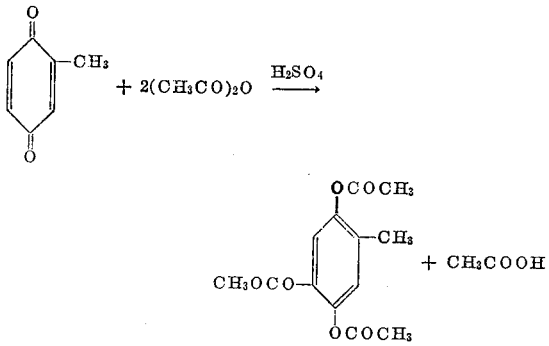

This procedure results in only a 40% yield of triacetoxy toluene and recovery of triacetoxy toluene from the reaction mixture is most difficult. It is an object of this invention to provide an improvement in the process for the preparation of triacetoxy toluene whereby significantly greater yields of the desired product are obtained and recovery from the reaction mixture is greatly simplified. Further objects will become apparent from the description of the invention which follows.

It has now been discovered that highly improved yields of triacetoxy toluene are obtained by reacting p-toluquinone with acetic anhydride in the presence of sulfuric acid at a temperature below about 25° C. It has been found that such a process results in at least a 70% yield of the desired product and recovery of triacetoxy toluene from the reaction mixture is materially simplified. The following example is illustrative of the novel process of this invention:

To a flask equipped with an efficient stirrer is charged 360 cc. (3.8 mols) of acetic anhydride. With constant agitation 9.9 cc. of 96% sulfuric acid is added while maintaining a temperature below 40° C. After all of the sulfuric acid has been added, the solution is cooled to 10° C. and 122 g. (1.0 mol) of p-toluquinone is added in small portions while maintaining the temperature in the range of about 10° C. to about 20° C. The resultant clear solution is then seeded with triacetoxy toluene and stirred at 20–25° C. for 12–16 hours precipitating white crystals of triacetoxy toluene.

At the end of the stirring, 300–400 cc. of water is added at a temperature of 20–30° C. The mixture is stirred at 15–20° C. for an additional ½ hour period and the solid triacetoxy toluene filtered therefrom.

The solid triacetoxy toluene is reslurried with 500 cc. of water, refiltered, and the solid washed with 400 cc. of water. The resulting crystals are washed with 150 cc. of cold methanol and then dried. 192 g. of triacetoxy toluene is obtained having a melting point of 110°–113° C. The yield of triacetoxy toluene thus obtained is 72% based upon the toluquinone originally added. The triacetoxy toluene thus obtained is predominantly the 2,4,5-triacetoxy toluene containing very minor amounts of the 2,3,5-triacetoxy toluene and the 2,5,6-triacetoxy toluene as impurities therein.

The novel process of this invention as described in the preceding example is subject to substantial variation without departing from the scope of this invention. For example, the improvement obtained by the novel process of this invention when compared with the processes run under conditions as heretofore used, will be realized notwithstanding the fact that the quantity of acetic anhydride utilized in the reaction mixture is varied over a substantial range. It is preferred, however, that at least two molecular proportions of acetic anhydride be utilized for each molecular proportion of p-toluquinone. Greater quantities of acetic anhydride may be used to advantage in order to provide a more mobile reaction medium.

In carrying out the novel process of this invention, the reaction temperature should be maintained below about 25° C. and preferably in the range of from about 10° C. to about 25° C. Temperatures lower than 10° C. may be utilized but offer no significant advantage over a reaction temperature in the range of 10° C. to 25° C.

The sulfuric acid utilized in the novel process of this invention serves as a catalyst and the concentration and the quantity of this catalyst may be substantially varied. Sulfuric acid having a concentration in the range of from about 90% to 100% sulfuric acid has been found particularly useful in this process. At the same time, the catalytic quantities of sulfuric acid utilized in the novel process of this invention may also be substantially varied. Preferably, however, the quantity of sulfuric acid utilized is in the range of from about 1% to 30%, calculated as 100% sulfuric acid, based upon the toluquinone initially charged.

After the reaction is complete, the triacetoxy toluene may be recovered from the reaction mixture by any method well known to those skilled in the art. The method set forth in the preceding example is illustrative of a particularly simple procedure.

What is claimed is:

1. In a process for the preparation of triacetoxy toluene, the step comprising reacting p-toluquinone and acetic anhydride in the presence of sulfuric acid at a temperature below about 25° C.

2. In a process for the preparation of triacetoxy toluene, the step comprising reacting a one molecular proportion of p-toluquinone with at least two molecular proportions of acetic anhydride in the presence of sulfuric acid at a temperature below about 25° C.

3. In a process for the preparation of triacetoxy toluene, the step comprising reacting p-toluquinone and acetic anhydride in the presence of sulfuric acid at a temperature in the range of about 10° C. to about 25° C.

4. In a process for the preparation of triacetoxy toluene, the step comprising reacting a one molecular proportion of p-toluquinone with at least two molecular proportions of acetic anhydride in the presence of sulfuric acid at a temperature in the range of from about 10° C. to about 25° C.

WILLIAM S. KNOWLES.

References Cited in the file of this patent

Thiele et al.: "Annalen Der Chemie" (1900) vol. 331, p. 349.

Mackenzie, Trans. Faraday Soc. 44, pp. 171–181 (1948).